United States Patent [19]

Cohen

[11] Patent Number: 4,457,734

[45] Date of Patent: Jul. 3, 1984

[54] FAIL-SAFE IMPROVEMENT FOR A FLEXIBLE SHAFT COUPLING

[75] Inventor: Edwin E. Cohen, Venice, Calif.

[73] Assignee: Hughes Helicopters, Inc., Culver City, Calif.

[21] Appl. No.: 319,187

[22] Filed: Nov. 9, 1981

[51] Int. Cl.³ .......................... F16D 3/10; F16D 3/79
[52] U.S. Cl. .................................... 464/30; 464/99; 464/160
[58] Field of Search .......................... 403/286, 336, 2; 464/32, 30, 99, 98, 160, 182, 179, 183

[56] References Cited

U.S. PATENT DOCUMENTS

| | | | |
|---|---|---|---|
| 2,188,510 | 1/1940 | Lapsley | 464/98 X |
| 4,219,286 | 8/1980 | Lindenthal | 464/32 X |
| 4,276,758 | 7/1981 | Loman et al. | 464/99 X |

FOREIGN PATENT DOCUMENTS 0059600  7/1938  Norway ................. 464/32

Primary Examiner—Stuart S. Levy
Assistant Examiner—Daniel P. Stodola
Attorney, Agent, or Firm—Beehler, Pavitt, Siegemund, Jagger & Martella

[57] ABSTRACT

A fail-safe flexible coupling is provided for coupling shafts, typically in an aircraft, wherein the coupling includes a plug coupled to the first shaft and a socket coupled to the first shaft and a socket coupled to the second shaft. The plug is arranged and configured to loosely mate with the socket when the shafts are being rotated together by virtue of their primary coupling. When the primary coupling fails, the socket and plug engage each other securely though the shafts continue to be driven notwithstanding the failure of the primary coupling between them. The plug is particularly characterized by a screw portion and head portion. The screw portion is threaded into the first shaft. The coupling is secured to the first shaft by the head portion of the plug.

4 Claims, 6 Drawing Figures

FAIL-SAFE IMPROVEMENT FOR A FLEXIBLE SHAFT COUPLING

BACKGROUND OF THE INVENTION

1. Field of the Invention

The present invention relates to the field of couplings between rotating shafts and in particular relates to improvements in flexible couplings between shafts whereby the shafts may continue to be driven even though the flexible coupling means between the shafts fails.

2. Description of the Prior Art

Flexible couplings are used in mechanical applications wherever two shafts need to be coupled and are not precisely coaxial at all times. One of the primary applications where this occurs is where there is a substantial amount of vibration, such as in vehicles and, in particular, in aircraft.

In an aircraft application not only are vibrational stresses particularly exaggerated, but all elements of the shaft and coupling must be extremely light weight and yet capable of carrying extremely high loads with a very high reliability. One of the flexible couplings used throughout aircraft is a "Bendix coupling" manufactured by the Bendix Corporation, one example which is illustrated in the drawings and which is sold and distributed as Bendix Model No. 19E111-1 and 19E149.

In the case where a flexible coupling is used to couple two shafts used in the power train in a helicopter, it is extremely important that the coupling has a high degree of reliable performance in a very adverse environment. Where the flexible coupling is used in the shaft which drives the tail rotor in a helicopter, it is important that power be delivered to the tail rotor at all times without interruption. Should power delivery to the tail rotor be lost, serious consequences may arise by the unexpected loss of control.

Therefore, what is needed is a lightweight and extremely reliable means whereby an improvement can be made in a flexible coupling used between two shafts whereby the shaft will be securely driven or engaged notwithstanding the failure of the coupling.

BRIEF SUMMARY OF THE INVENTION

The present invention is an improvement in a flexible coupling having a first member coupled to a first shaft and a second member coupled to a second shaft. The first and second members are coupled by means of a flexible portion of the coupling. The improvement comprises a plug means for coupling to the first shaft and a socket means for coupling to the second shaft. The plug means is arranged and configured to loosely mate with the socket means in a first condition, namely the condition in which the flexible coupling has not failed, and then to securely engage the socket means in a second condition, namely the condition in which the flexible coupling has failed. By virtue of this improvement when the flexible coupling fails, the plug and socket means securely engage each other such that the first and second shafts continue to drive without interruption.

The invention can also be characterized as an improvement in a method for driving two shafts which are coupled by a flexible coupling. The improvement in the method comprises the steps of driving the shafts through the flexible coupling as long as the flexible coupling does not fail. When the flexible coupling fails, the shafts are driven by engaging the plug means, which is coupled to one of the shafts, with a socket means, which is coupled to the other shaft. The plug and socket means are engaged with each other as a result of the failure of the flexible coupling. Again, by reason of the improvement in this method, flexibly coupled shafts will continue to drive without interruption even when the flexible coupling connecting them fails.

These advantages and others derived from the present invention can be better understood by considering the following description of the preferred embodiments in light of the figures wherein like elements are numbered with like numerals.

DETAILED DESCRIPTION OF THE PREFERRED EMBODIMENTS

The present invention is an improvement in a flexible coupling of the type typically used in aircraft and in particular in rotary aircraft whereby the delivery of power to a tail rotor may continue in an uninterrupted fashion even in the case where the flexible coupling, which connects shaft segments in the drive train, completely fails. The failure of the coupling actuates the engagement of the fail-safe means included within the coupling so that power delivery continues without interruption.

Figure 1:
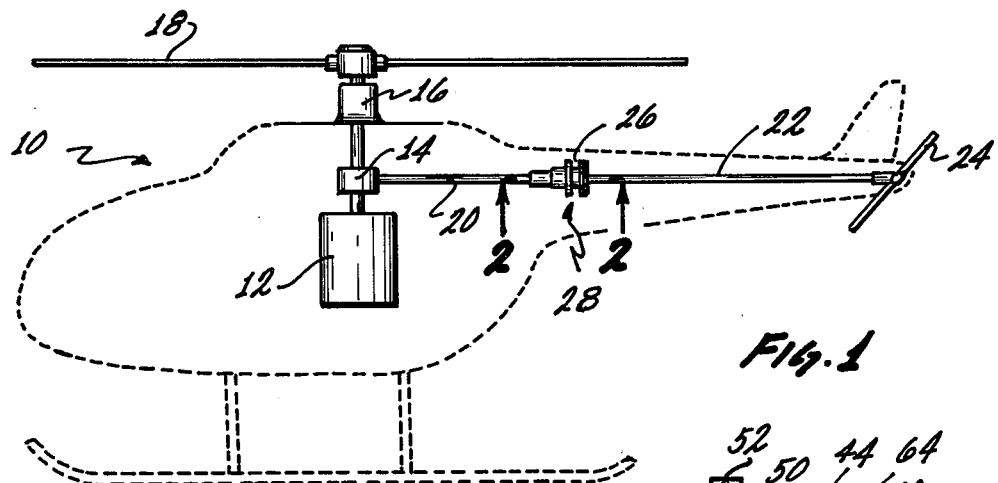
FIG. 1 is a diagrammatic view of a helicopter showing the environment in which a flexible coupling may be used to deliver power to a tail rotor.

FIG. 1 illustrates the environment in which an improved coupling in the present invention may be used. Helicopter 10 is shown in phantom outline, and includes a motor 12 coupled to a transmission 14 which in turn is coupled to a rotor hub 16 and blades 18. Transmission 14 also includes a drive shaft 20 coupled to a rotor drive shaft 22 which is ultimately coupled to tail rotor blades 24. Shafts 20 and 22 are coupled to each other through a flexible opening 26. Although coupling 26 has been shown in the tail rotor drive transmission, it must be understood that flexible couplings are used throughout helicopter 10 in any application where two shaft segments may be connected.

Figure 2:
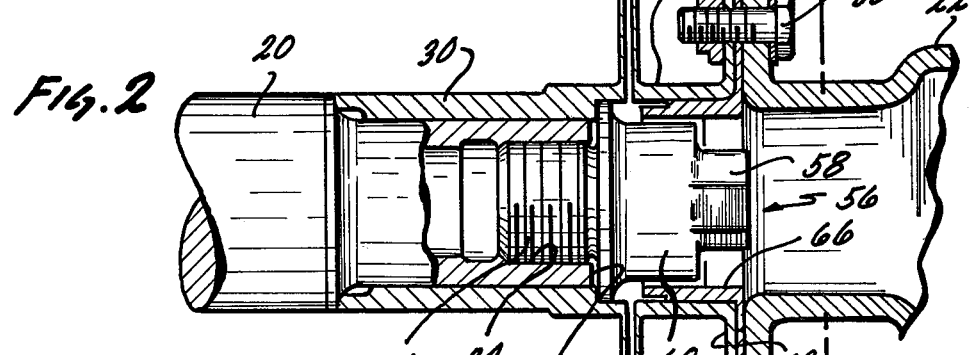
FIG. 2 is a cross section of the coupling showing the insertion of the plug and socket means inside the flexible coupling.

FIG. 2 is a cross section of that portion of the drive train indicated by reference numeral 28 in FIG. 1. Shaft 20 is shown as coupled through flexible coupling 26 to shaft 22. Flexible coupling 26 is well known to the art and is sold by Bendix Corporation in a variety of models.

Figure 3:
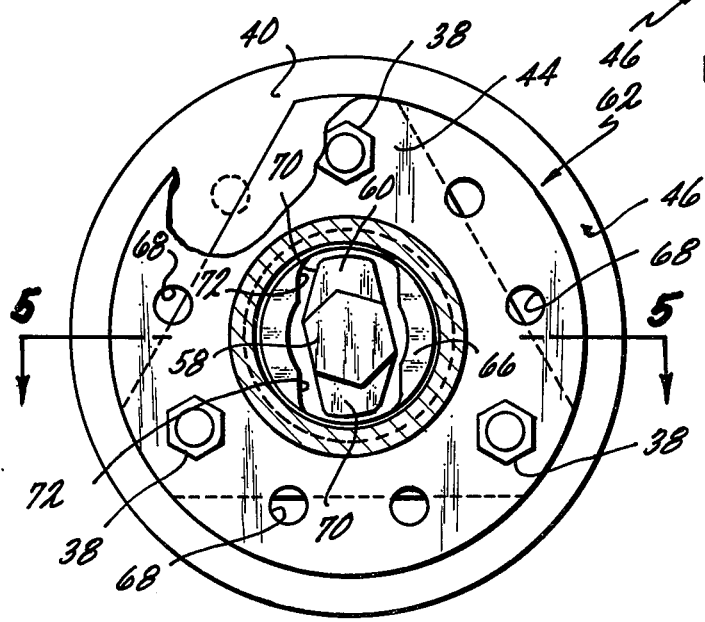
FIG. 3 is an end view of the cross section shown in FIG. 2.

Flexible coupling 26 is particularly characterized as being comprised of a first member 30 and a second member 32. First member 30 is securely coupled to shaft 20 by conventional means and in particular in the prior art embodiment by a bolt whose head engaged member 30 and whose threaded body is screwed into a mating, threaded hole provided in end 36 of shaft 20. The means of coupling first member 30 to shaft 20 in the present invention is described below. Second member 32 is secured to shaft 22 by conventional means and is best shown in FIG. 3 as being three bolts 38 coupled to a flange 40 in end 42 of shaft 22. In the particular embodiment illustrated, second member 32 has a triangular termination 44, best shown in FIGS. 3 and 4.

Members 30 and 32 are flexibly coupled to each other by means of a circular diaphram 46 shown in FIG. 2 as being comprised of two thin circular steel sections 48 and 50 coupled respectively at their inner diameters to members 30 and 32 and coupled together at their circumferential edge by a bond 52. Thus, shaft 20 drives shaft 22 although diaphram 46 which allows for a large degree of vibrational freedom between shafts 20 and 22 by virtue of the flexibility of diaphram plates 48 and 50. Although the present invention has been described in connection with a specific type of flexible coupling it must be understood that the invention is not so limited and could be used as an improvement in many other types of equivalent couplings by making modifications thereto which would be obvious to one with ordinary skill in the art.

According to the improvement of the present invention, member 30 is securely coupled to shaft 20 by means of a bolt 54 threaded in a conventional manner into hole 34 of shaft 20, but with a newly configured head 56. Head 56 is comprised of a hex head tightening portion 58 and a shoulder drive portion 60. This combination of elements forms a plug means for securely coupling first member 30 to shaft 20. As we shall see, this plug means is arranged and configured to engage a socket means in the event that flexible coupling 26 should fail.

The socket means is comprised of an insert 62 which has a flange portion 64 and a socket portion 66. Flange portion 64 forms a circular flange having a plurality of holes 68 machined in its circumferential area for coupling with bolts 38. Bolts 38 are through-bolted through holes 68 as shown in FIG. 2 whereby the socket means, second member 32 and shaft 22 form a rigidly coupled combination.

Figure 4:
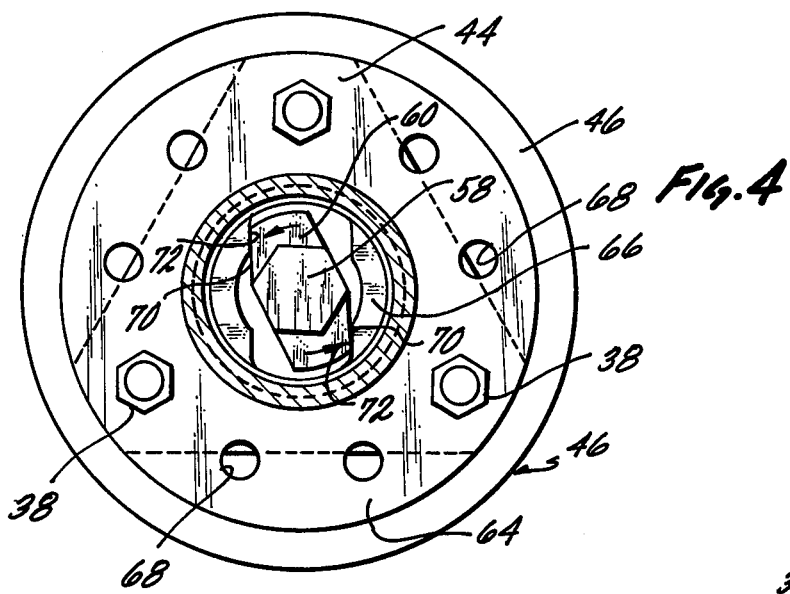
FIG. 4 is the end view of FIG. 3 after the coupling has failed showing the fail-safe plug and socket combination engaged.

As best shown in FIGS. 3 and 4, socket portion 66 is particularly adapted such that shoulder portion 60 of the plug means fits within socket portion 66 with sufficient clearance to allow the vibrational degrees of freedom normally expected between shafts 20 and 22. However, as particularly illustrated in FIG. 4 should flexible coupling 26 fail, shoulder portion 60 is driven against socket portion 66 such that surface 70 jams against surface 72 of socket portion 66. Surfaces 70 and 72 are machined flat such that when shoulder portion 60 is driven against socket portion 66, a flat surface to surface contact is made between surfaces 70 and 72. Thus, the engagement between the plug means and socket means is solid and secure. No edges are knocked off, such as would be the case of a hex head rotating within a hex socket. The torsional strength of the engagement between the plug means and socket means is so great that all other portions of the drive transmission are likely to fail prior to the plug means or socket means shearing.

Hex head 58 does not engage a socket means in any manner and is solely used for tightening bolt 54 within hole 34. Hex head 58 is recessed or has a smaller effective diameter than shoulder portion 60 to allow for easy and convenient insertion of a tool within the end of member 32 during assembly. As before, shoulder portion 60 serves as a bolt head to secure first member 30 to end 36 of shaft 20.

Figure 5:
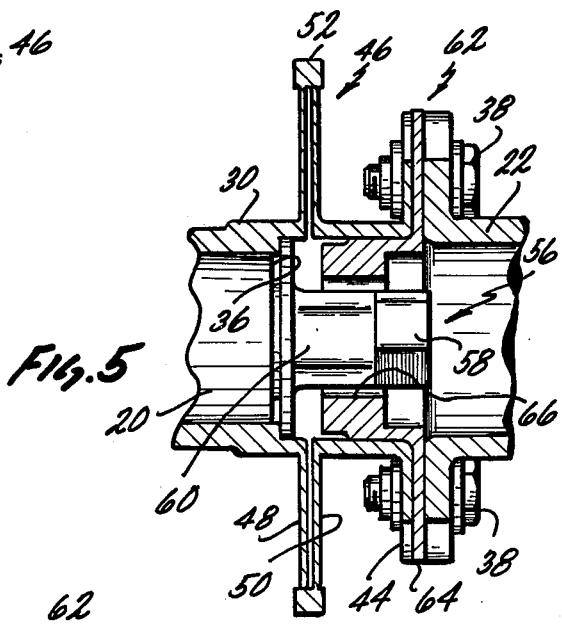
FIG. 5 is a cross section of the improved flexible coupling taken through section lines 5—5 of FIG. 3.

FIG. 5 better illustrates the arrangement and configuration of the socket means and plug means within flexible coupling 26. FIG. 5 clearly shows that the inside diameter of the socket means is not circular in cross section but assumes a shape which closely circumscribes the outline of shoulder portion 60. The amount of clearance is just large enough to allow for all possible vibrational degrees of freedom as previously stated, yet is maintained small enough such that unacceptable impact forces between shoulder portion 60 and socket portion 66 are avoided. When flexible coupling 26 fails, delivery of power between shafts 20 and 22 is interrupted for an insignificant amount of time, namely the short time required for shoulder portion 60 to engage socket portion 66. Inasmuch as shaft 22 is still rotating during that time, the impact force between shoulder portion 60 and socket portion 66 is further reduced. In fact, the amount of disruption in the delivery of power between shafts 20 and 22 is so small that in most circumstances the pilot of the aircraft will be unaware that coupling 26 has failed. In most circumstances, the engagement and operation of the plug means in combination with the socket means will not create any perceptible difference in the performance of the aircraft or audible noise. It is entirely possible and within the scope of the present invention that various types of indicating devices may be incorporated in flexible coupling 26. However, improvement of the present invention does not require the use of such devices for its successful operation or use.

The degree of flexible coupling between shafts 20 and 22 is maintained or slightly increased when the plug and socket combination of the present improvement is engaged. Surfaces 70 and 72 are maintained in contact solely by rotation of shafts 20 and 22. In other words, the surfaces are pressed tightly together only by the frictional force and resistance of shaft 22 to the rotation of shaft 20. After the aircraft has landed, there is no further resistive force transmitted from the tail rotor to shaft 22 to cause the tight engagement of surfaces 70 and 72. At that time it becomes obvious that the tail rotor is much more loosely coupled to the transmission than was previously the case. The degree of looseness is used as a reliable measure by ground crews that flexible coupling 26 has failed and needs to be replaced before the next flight.

Figure 6:
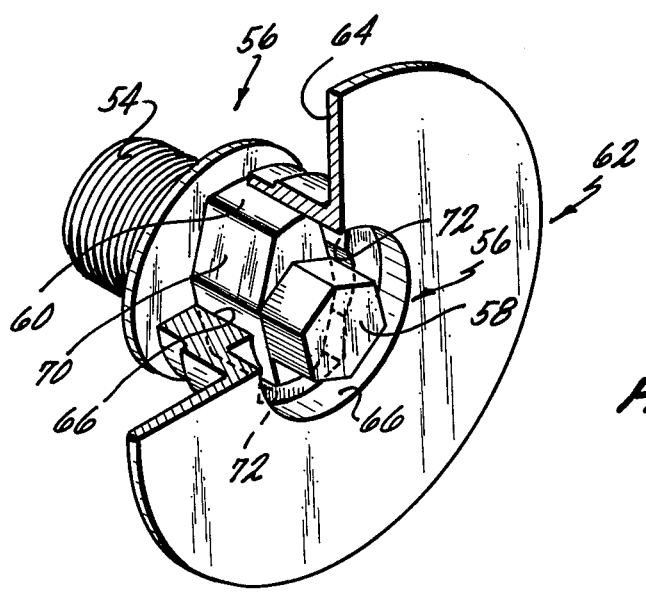
FIG. 6 is a perspective cutaway view of the socket and plug means illustrating their relative shape and position.

FIG. 6 shows in a cutaway perspective the essential features of the improvement constituting the present invention. It can be seen that the hex head portion 58 extends beyond the socket portion 66 and that shoulder portion 60 is disposed within the socket hole defined by socket portion 66 with more than adequate clearance to allow for all degrees of vibrational rotation during normal operation. The prespective view also graphically illustrates the simplicity and ruggedness of the combination of the plug and socket that gives rise to the high reliability of this fail-safe combination. The simplicity allows the improvement to be economically fabricated and results in a fault free performance.

Although the illustrated embodiment is a design which is intended to be retrofitted in existing flexible couplings, it should be clear that the basic principle illustrated by the design can be incorporated in the original design of couplings of all types with a minimum of increased complexity and cost. Therefore, it must be understood that many modification and alterations can be made to the present invention, when applied to originally manufactured couplings as well as a diverse variety of retrofitted couplings, without departing from the spirit and scope of the present invention as set forth in the following claims. The illustrated embodiment has been discussed only as a means for clarifying one application of the present invention and should not be taken as a limitation or restriction of the scope of the invention.

I claim:

1. An improvement in a flexible coupling having a first member coupled to a first shaft, and a second member coupled to a second shaft with a flexible portion coupling said first and second members, said improvement comprising:

plug means for coupling to said first shaft; and socket means for coupling to said second shaft, said plug means arranged and configured to loosely mate with said socket means in a first condition and to securely engage said socket means in a second condition;

wherein said plug means has a screw portion and a head portion, said screw portion being threaded into said shaft and said first member of said flexible coupling being secured to said first shaft by means of said head portion, said head portion having a shoulder portion and bolt head portion;

whereby when said flexible coupling fails said second condition obtains and said plug and socket means securely engage each other such that said first and second shafts continue to drive.

2. The improvement of claim 1 wherein said plug means has a shoulder portion in the form of two, oppositely disposed lobes, each lobe being provided with at least one flat surface.

3. The improvement of claim 2 wherein said socket means defines an opening having a shape approximating the shape of said shoulder portion and having a larger outline so that said opening is everywhere displaced from said shoulder portion by a clearance when said socket means and plug means are configured in said first condition.

4. The improvement of claim 3 wherein said opening defined by said socket means has at least two flat surfaces arranged and configured to contact two corresponding flat surfaces provided on said shoulder portion of said plug means.

* * * * *